(12) United States Patent
Heavens

(10) Patent No.: US 7,251,901 B2
(45) Date of Patent: Aug. 7, 2007

(54) MEASUREMENT DEVICE AND PROCESS

(75) Inventor: Glenn G. Heavens, Cheshire, CT (US)

(73) Assignee: Illinois Tool Works Inc, Glenview, IL (US)

( * ) Notice: Subject to any disclaimer, the term of this patent is extended or adjusted under 35 U.S.C. 154(b) by 52 days.

(21) Appl. No.: 11/228,650

(22) Filed: Sep. 16, 2005

(65) Prior Publication Data

US 2007/0062056 A1   Mar. 22, 2007

(51) Int. Cl.
*G01B 3/00*   (2006.01)

(52) U.S. Cl. .................... 33/555.1; 33/555; 33/542
(58) Field of Classification Search ............ 33/555.1, 33/555, 555.2, 555.3, 832–833, 710–712, 33/542–543, 549, DIG. 15
See application file for complete search history.

(56) References Cited

U.S. PATENT DOCUMENTS

| | | | | |
|---|---|---|---|---|
| 5,105,554 A | * | 4/1992 | Schnyder et al. | 33/542 |
| 5,208,996 A | * | 5/1993 | Schaldach | 33/555 |
| 5,230,157 A | * | 7/1993 | Ota et al. | 33/555.1 |
| 5,465,497 A | * | 11/1995 | Kowdley et al. | 33/555 |
| 6,205,672 B1 | * | 3/2001 | Paulsen et al. | 33/555.1 |

* cited by examiner

*Primary Examiner*—Yaritza Guadalupe-McCall
(74) *Attorney, Agent, or Firm*—Mark W. Croll; Paul F. Donovan

(57) ABSTRACT

A measuring device includes a receiver having a cavity with differing narrowing diameters from an opening. The receiver can be moved axially. A part is moved a predetermined fixed distance, including movement while engaging and moving the receiver. The distance moved by the receiver is sensed, and the acceptability of the dimension of the object is determined by evaluating the distance moved by the receiver.

20 Claims, 3 Drawing Sheets

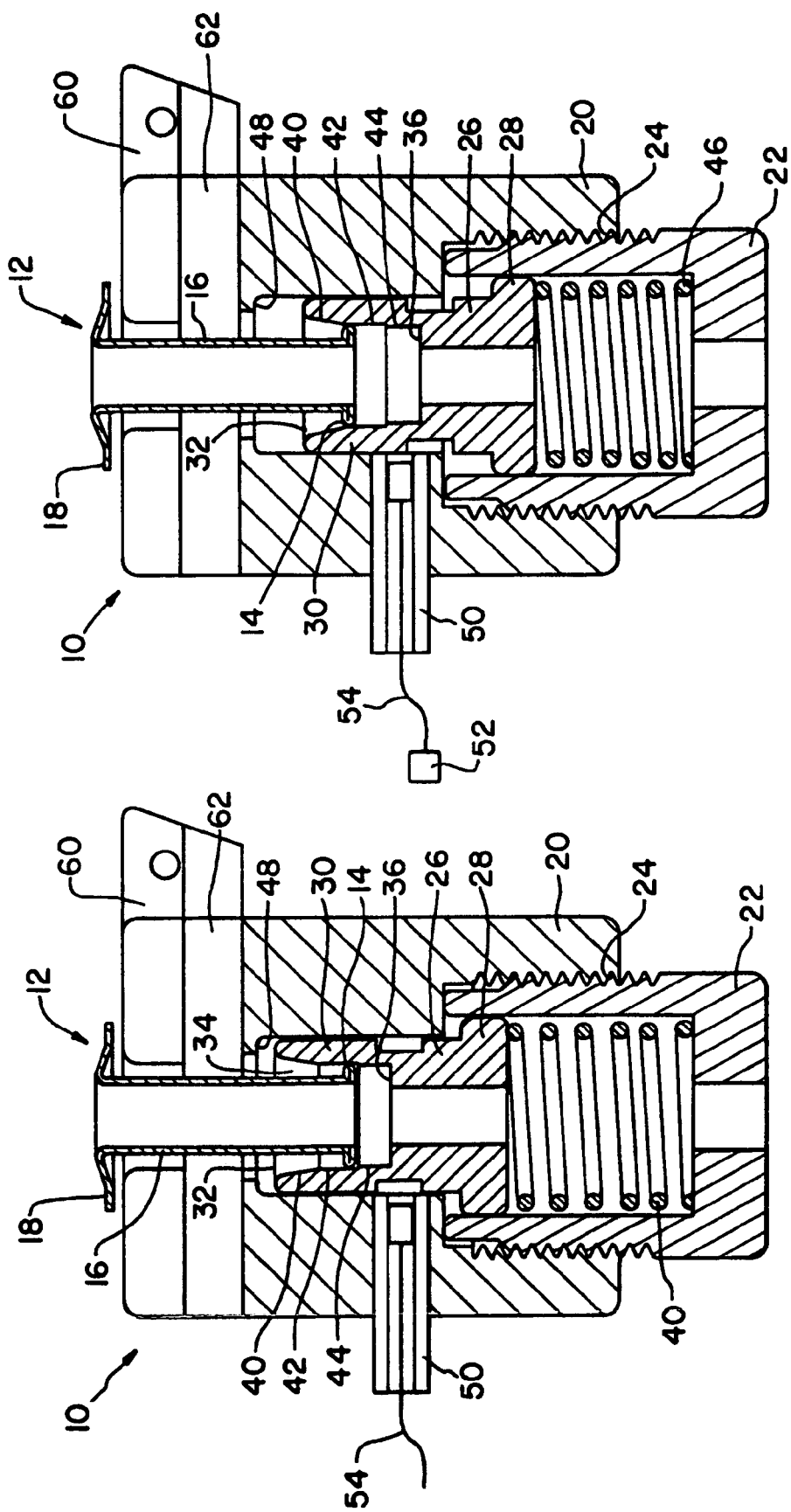

MEASUREMENT DEVICE AND PROCESS

FIELD OF THE INVENTION

The present invention relates generally to measurement devices and processes; and more particularly, the invention pertains to a device and process for measuring the diameter of round objects, such as flared or flanged ends of parts formed by stamping.

BACKGROUND OF THE INVENTION

Parts and pieces of many different types and shapes are made by stampings and progressive stampings for use in a variety of different assemblies and constructions. Metal can be shaped into many different forms and configurations by the application of force causing a metal blank to conform to the shape of a die used while applying the force. Simple parts and pieces can be made by a single stamping. In a single stamping, force is applied in a single event so that the metal conforms to a die used while applying the force. For more complex parts or parts taking a shape quite different from the original metal blank, progressive stampings are used. In progressive stampings, a series of dies are used in a series of stamping events, with each die and each stamping event forming the metal in stages from the original blank to the desired final formation.

It is known to use stamping techniques to form a variety of parts having a head or a flange at an end thereof. For example, a substantially cylindrical or tubular part can be stamped to have a peripheral flange at one end. The stamping process may include a first formation process to form a flair or outward expansion of the tube, with a final process to complete the flange.

Stamping is often used to make parts and pieces inexpensively, since a stamping event is a rapid occurrence. Accordingly, parts can be formed quickly and inexpensively, with minimal waste. To ensure a high percentage of quality parts are shipped to customers cost effectively, testing procedures for stamped parts must be performed rapidly and reliably. Preferably, a testing method occurs quickly so that testing or inspection of the part does not slow the overall process of making the part.

Precisely dimensioned parts are sometimes required for proper sealing and/or fit or to ensure accuracy of a subsequent operation. Measuring the prescribed dimension can be difficult and time consuming. Since many parts made by stamping are produced quite rapidly and at low cost it is desirable that an apparatus and process for measuring the dimension work equally fast so as not to slow the manufacturing process unacceptably, or unduly add cost to the final price of the part.

What is needed in the art is a measurement device and process to quickly and accurately measure a dimension, such as the flared end of a stamped part.

SUMMARY OF THE INVENTION

The present invention provides a device for indirectly measuring a part to determine if a dimension of the part falls within an acceptable range for the dimension.

In one aspect thereof, the present invention provides a measuring device with an axially movable receiver defining a cavity with a narrowing diameter inwardly in the receiver for engaging the object to be measured, and a transport means for moving the object a fixed predetermined overall distance. A sensing means determines the distance moved by the receiver.

In another aspect thereof, the present invention provides a measuring device for measuring a diameter of an object. The measuring device has a receiver movable by pushing the object against the receiver. The receiver has an opening thereto and areas therein of different, narrower diameters inwardly from the opening. A sensor detects a distance moved by the receiver, and a transport means moves the object a fixed predetermined distance relative to the sensor.

In a still further aspect thereof, the present invention provides a process for measuring a diameter of an object The process has steps of providing a receiver for receiving the object to be measured, the receiver having an opening and a cavity formed therein of different diameters inwardly from the opening; inserting the object into the receiver; moving the object a fixed predetermined overall distance; evaluating a distance moved by the receiver from moving the object the fixed distance; and determining acceptability of the part with consideration for the distance moved by the receiver.

An advantage of the present invention is providing a device that determines a dimension of a part in a quick and accurate manner.

Another advantage of the present invention is providing a device and process for measuring the diameter of flanged parts to determine if the part falls within an acceptable diameter range.

Other features and advantages of the invention will become apparent to those skilled in the art upon review of the following detailed description, claims and drawings in which like numerals are used to designate like features.

BRIEF DESCRIPTION OF THE DRAWINGS

FIG. 1 is a cross-sectional view of a measurement apparatus in accordance with the present invention, illustrating the device determining the diameter of a part of acceptable diameter;

FIG. 2 is a cross-sectional view similar to that of FIG. 1, but illustrating the measurement device of the present invention determining the diameter of a part of larger diameter than that shown in FIG. 1;

Figure 3:
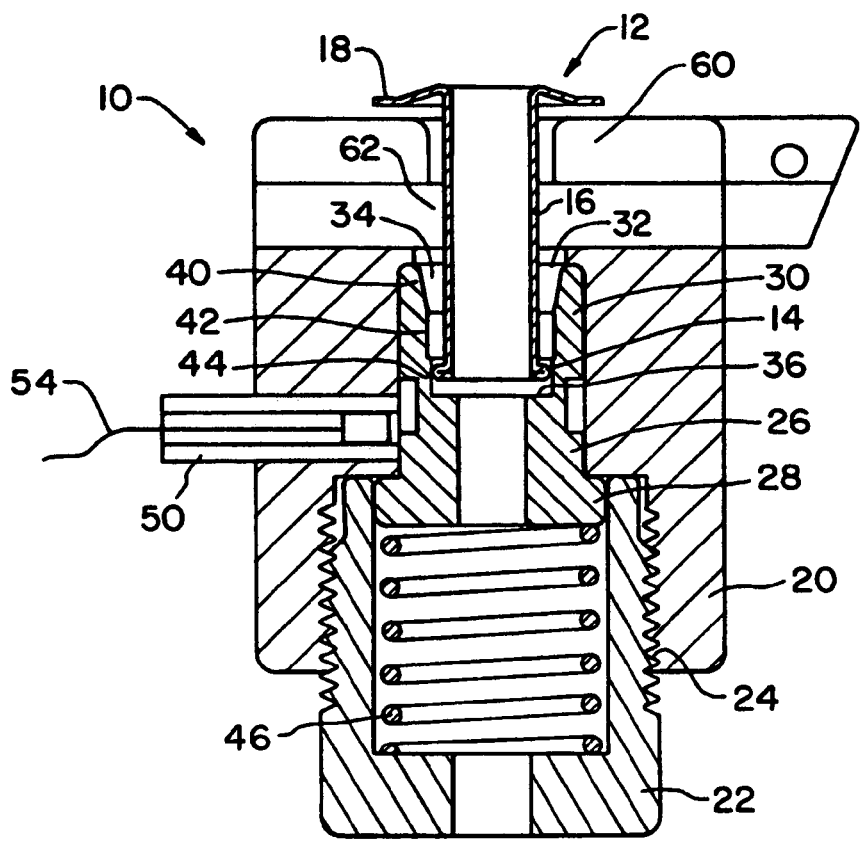
FIG. 3 is a cross-sectional view similar to that of FIGS. 1 and 2, but illustrating the measurement device of the present invention determining the diameter of a part of smaller diameter than that shown in either FIG. 1 or 2.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

DETAILED DESCRIPTION OF THE PREFERRED EMBODIMENT

Referring now more specifically to the drawings and to FIG. 1 in particular, a measurement device 10 in accordance with the present invention is shown for measuring a dimension of a part 12. More specifically, measurement device 10 is provided for measuring the diameter of a flared end 14 of part 12. Those skilled in the art should understand readily from the descriptions following hereafter that measurement device 10 can be configured in other forms for measuring dimensions of items different from part 10, and for measuring dimensions other than diameters of substantially circular configurations. Part 12 shown and described is merely illustrative of a part for which the present invention can be used.

Part 12, as shown in the drawings, includes a body 16 and a flanged end 18. Measurement device 10 is shown for measuring flared end 14, but could be configured differently for measuring a diameter of flanged end 18 as well. As mentioned previously, in accordance with the principals of the present invention other configurations and arrangements for measuring device 10 also can be used.

Measuring device 10 includes a fixed component 20 carrying a cylinder 22 therein. In the exemplary embodiment, cylinder 22 is shown as threadedly engaged with fixed component 20 at threads 24. However, it should be understood that other types of attachment can be used, or cylinder 22 can be formed as an integral portion of fixed component 20 so that fixed component 20 and cylinder 22 define a monolithic body.

A piston-like body 26 includes a head portion 28 received and axially slidable in cylinder 22. An end of body 26 opposite head portion 28 defines a receiver 30 having an opening 32 in the distal end of body 26. From opening 32, receiver 30 defines a narrowing receiver surface 34. In the exemplary embodiment, opening 32 is substantially circular, and receiver surface 34 has a variety of zones also substantially circular in cross-section. Surface 34 defines a generally narrowing cavity from opening 32 inwardly to an abutment 36. Surface 34 can be continuously tapered at a constant angle or can define distinct zones at different angles. For example, the exemplary embodiment illustrates an outer zone 40 angling inwardly, a middle zone 42 of a first diameter and an inner zone 44 of a second diameter narrower than middle zone 42. Outer zone 40 is conical, tapering inwardly. Middle zone 42 and inner zone 44 are substantially cylindrical but of different diameters.

A spring 46 biases body 26 outwardly relative to cylinder 22. A stop 48 establishes a home position for body 26, with body 26 being biased thereagainst by spring 46.

A sensor system 50 is in fixed position in fixed component 20 and is configured and arranged for sensing a position of body 26. Those skilled in the art will readily understand that a variety of optical or other types of position sensors can be used for sensing indicia or other reference points on body 26. Sensor system 50 is connected to a control system 52 via a signal pathway 54. Control system 52 can be configured to convey a variety of messages or information, such as the actual dimension determined, the acceptability or unacceptability of the part, or can be configured to take action such as issuing audio and/or visual alarms, stopping operation of device 10, etc.

A mover 60 axially translatable relative to fixed component 20 includes grasping means 62 such as fingers, clamps or the like for securing part 12 therein. Grasping means 62 is configured for receiving and grabbing part 12 at a consistent position relative to flared end 14. That is, a distance from grasping means 62 to flared end 14 is consistent for each part 12 secured therein.

In the use of measurement device 10, part 12 is loaded in grasper 62 and moved by grasping means 62 into receiver 30. Because of the narrowing configuration of receiver 30 at more inwardly positions, part 12 will contact receiver 30 more shallowly or more deeply depending on the diameter of flared end 14. Part 12 is moved an overall axial distance that is fixed. The distance that body 26 moves away from stop 48 relative to cylinder 22 and sensor system 50 is dependent upon the location at which flared end 14 contacts surface 34. Thus, if flared end 14 is narrow and moves more deeply into receiver 30, such as to inner zone 44 or against abutment 36, body 26 will move a short distance. If flared end 14 is of wide diameter and contacts receiver 30 at a more shallow location, such as in outer zone 40 or middle zone 42, body 26 will move a greater axial distance. The distance moved by body 26 thereby is directly related to the diameter of flared end 14.

Control system 52 (FIG. 2) attached to sensor system 50 by a signal transmission pathway 54 can be complex or simple. For example, control system 52 can evaluate a distance moved by body 26 and determine a specific diameter for flared end 14 and thereafter report the dimension on a screen or the like. Alternatively, a control system 52 attached to sensor system 50 can simply determine if the distance traveled by body 26 falls within a predetermined acceptable range, thereby indicating an acceptable size diameter for flared end 14 and allowing the part to be considered an acceptable part. If the movement of body 26 fails to reach a minimum required distance or exceeds a maximum allowable distance, a warning system can alert an operator visually and/or audibly so that the part being evaluated can be rejected. Alternatively, control system 52 can automatically reject a part, segregating the part for waste handling or can flag the part for later separation, allowing the part to continue through the process until an end point of the process. Control system 52 can operate automatically or can activate a warning light, buzzer or other means of notifying an operator to remove an unacceptable part.

Figure 4:
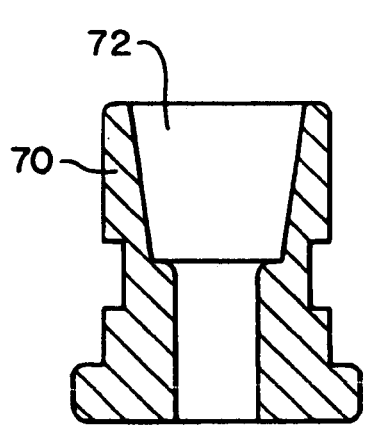
FIG. 4 is a cross-sectional view of a modified form of a portion of a device in accordance with the present invention.
Figure 5:
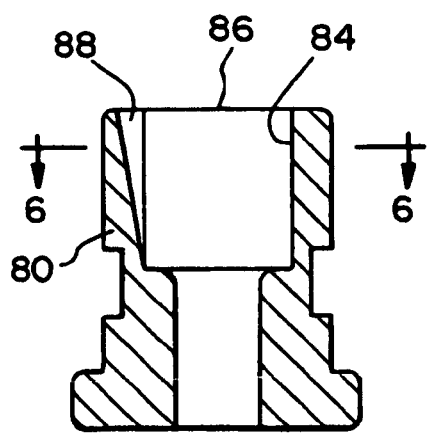
FIG. 5 is a cross-sectional view similar to that of FIG. 4, but illustrating yet another embodiment of the present invention.
Figure 6:
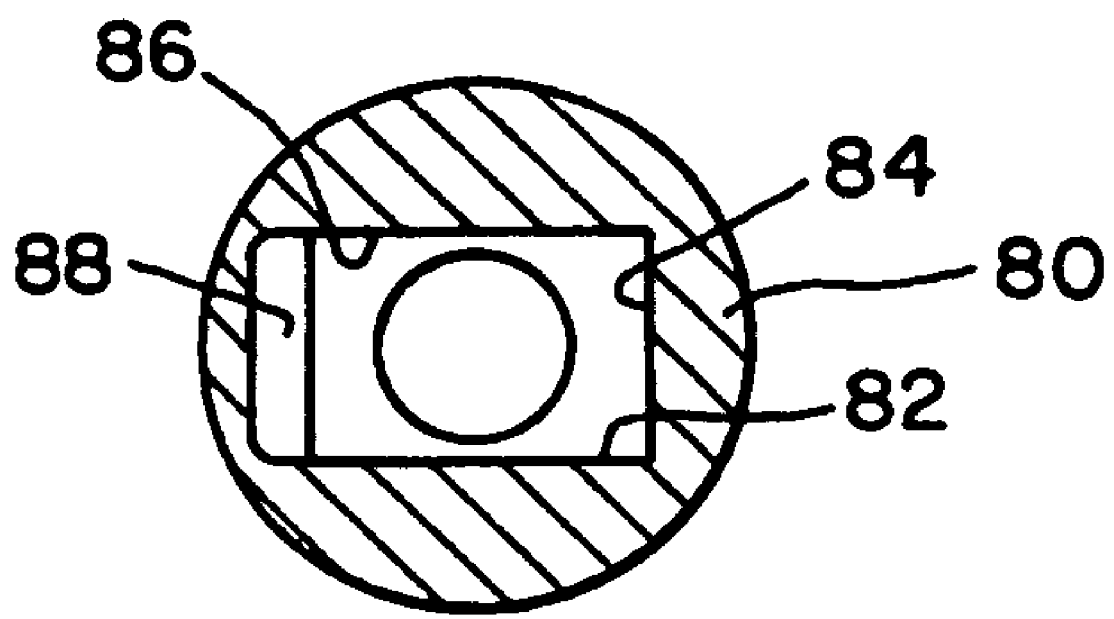
FIG. 6 is a cross-sectional view of the portion of the present invention shown in FIG. 5, taken along line 6-6 of FIG. 5.

It should be understood that the concept of a varying diameter receiver can be modified to accommodate parts of different shapes or configurations. For example, FIG. 4 illustrates a receiver 70 having a continuously tapering, conical surface 72. FIGS. 5 and 6 illustrate a receiver 80 having substantially flat axially oriented surfaces 82, 84, 86 and a tapered surface 88. It should be understood that still further variations and modifications also can be used so that a device of the present invention can be used to measure diameters, lengths, widths or other dimensions of parts and components of different shapes.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A measuring device for measuring an object, said measuring device comprising:
   an axially movable body defining a receiver;
   an end of said receiver having an opening and a cavity extending inwardly in said receiver from said opening, said cavity having a surface of narrowing diameter inwardly from said opening for engaging the object to be measured;
   transport means for moving the object a fixed predetermined overall distance including a distance into said cavity; and
   sensing means for determining an axial distance moved by said receiver upon movement of the object said fixed distance.

2. The measuring device of claim 1, said surface in said receiver being a conical surface.

3. The measuring device of claim 1, said surface having at least two zones of different diameters.

4. The measuring device of claim 1, said receiver having an outer zone angling inwardly from said opening, and a zone inwardly of said outer zone at an angle different from said outer zone.

5. The measuring device of claim 1, said receiver having a conical outer zone extending inwardly from said opening, a middle zone substantially axial relative to said receiver; and an inner zone inwardly of said middle zone and of a diameter more narrow than said middle zone.

6. The measuring device of claim 5, said inner zone being substantially axial relative to said receiver.

7. The measuring device of claim 1, including a spring biasing said receiver to a starting position.

8. A measuring device for measuring a diameter of an object, said measuring device comprising:
   an axially movable body defining a receiver axially movable by pushing the object against the receiver;
   said receiver having an opening in an end of said body and a cavity having a fixed surface with areas therein of different, narrower diameters inwardly from said opening, said surface engaging the object being measured;
   a sensor for detecting an axial distance moved by said receiver;
   transport means for moving said object a fixed predetermined distance; and
   said transport means moving said receiver axially through contact with said object within said fixed predetermined distance.

9. The measuring device of claim 8, said receiver including a tapered surface.

10. The measuring device of claim 9, said tapered surface being conical.

11. The measuring device of claim 8, said receiver having at least two zones of different diameter.

12. The measuring device of claim 8, said receiver including a tapered surface angling inwardly relative to said opening and a fixed diameter portion inwardly from said tapered surface.

13. The measuring device of claim 12, including an inner fixed diameter zone disposed inwardly from said opening relative to said first mentioned fixed diameter zone, said inner fixed diameter zone being of a diameter less than a diameter of said first mentioned fixed diameter zone.

14. The measuring device of claim 8, including an abutment in said receiver establishing a maximum distance for insertion of said object into said receiver.

15. The measuring device of claim 8, said receiver biased toward said transport means.

16. The measuring device of claim 15, including a stop establishing a home position from which said receiver can be moved.

17. A process for measuring a diameter of an object, said process comprising steps of:
   providing an axially movable receiver for receiving the object to be measured, the receiver having an end opening and a cavity formed therein by a surface of different diameters inwardly from the opening;
   inserting the object into the receiver through the end opening;
   moving the object a fixed predetermined overall distance;
   moving the receiver axially by contact with the object within the fixed predetermined overall distance;
   evaluating an axial distance moved by the receiver from moving the object the fixed distance; and
   determining acceptability of the object with consideration for the axial distance moved by the receiver.

18. The process of claim 17, including rejecting parts causing the receiver to move less than a predetermined minimum distance.

19. The process of claim 17, including rejecting parts causing the receiver to move more than a maximum predetermined distance.

20. The process of claim 19, including rejecting parts causing the receiver to move less than a predetermined minimum distance.

* * * * *